June 20, 1933.  C. W. LEGUILLON  1,915,061
STOCK RACK
Filed Nov. 7, 1929
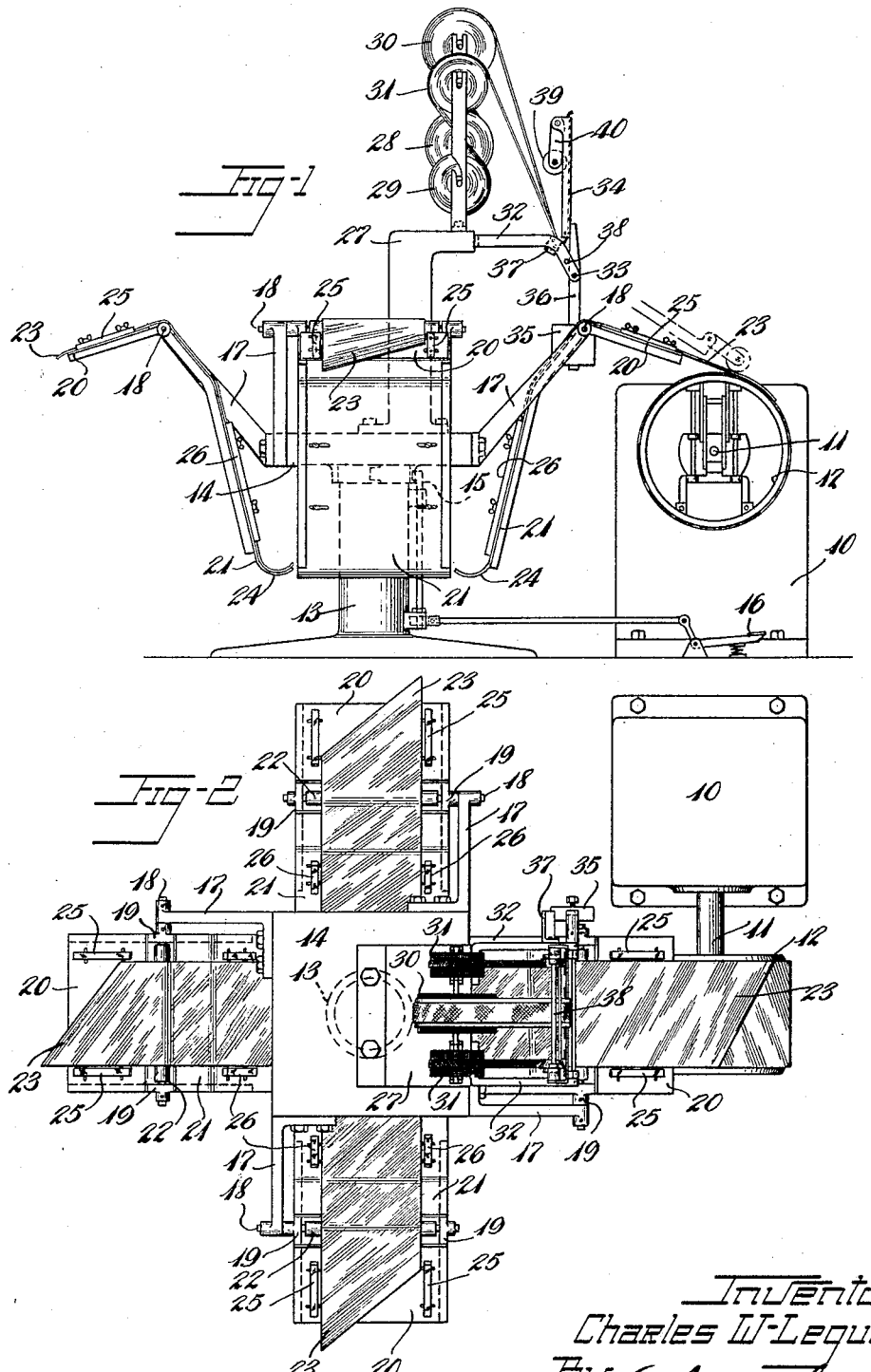
Inventor
Charles W. Leguillon
By Eakin & Avery
Attys.

Patented June 20, 1933

1,915,061

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

STOCK RACK

Application filed November 7, 1929. Serial No. 405,526.

This invention relates to stock racks and to methods of handling stock, and more especially it relates to procedure and apparatus for supporting and manipulating the various lengths of rubberized fabric which go into the carcasses of pneumatic tires.

In the manufacture of pneumatic tires of the flat or pulley band type it is common practice to mount the rolls of liner and rubberized fabric on a turret adjacent the tire-building machine, and to draw the fabric therefrom and apply it immediately to the tire building drum or form. Because of adhesion of the fabric to its liner, the fabric usually is stretched in being withdrawn from its roll, and does not retract to normal condition before its application to the form, with the result that inferior tires of non-uniform strength are produced. Also, considerable care is required to draw the fabric in proper alignment onto the form.

The chief objects of this invention are to avoid incorporating stretched or distorted fabric in a tire; to expedite the building of tires so as to increase the output of the tire building machines; to provide conveniently for accurate alignment of the fabric; to produce improved tires at lower cost; and to provide an improved method and a device of simple construction whereby the foregoing objects are attained.

Of the accompanying drawing:

Fig. 1 is a side elevation of a stock rack embodying and adapted to carry out my invention in its preferred form, and the work therein, a tire building machine also being shown in association with the rack.

Fig. 2 is a plan view of the mechanisms shown in Fig. 1.

Referring to the drawing, 10 is the housing of a tire building machine, 11 is a rotatable spindle extending laterally therefrom, and 12 is a collapsible drum or form upon which tires are built, the tire machine being of a type well known in the tire industry.

Positioned adjacent the tire machine is my improved stock rack, which in its preferred form here shown comprises a pedestal base 13 supporting a square turret or turntable 14, suitable indexing mechanism 15 being provided by which the tire builder may effect angular movement of the turret by depressing a foot treadle 16 positioned in front of the tire machine 10. Secured to the respective marginal faces of the turret 14, and extending outwardly and upwardly therefrom are arms 17, 17 there being one arm secured to each of the four faces of the turret, at one side of the face. Extending laterally from the end of each arm 17 is a horizontal bar or spindle 18, and mounted thereon adjacent its respective ends is a pair of angular, substantially L-shaped brackets 19, 19 connected to each other by fabric-supporting plates 20, 21 at opposite sides of the spindle 18. A roller or rotatable sleeve 22 is journaled on the spindle 18 between the brackets 19 and between the adjacent margins of the plates 20, 21.

The arrangement is such that one after another of the fabric supporting units on the turret 14 may be positioned adjacent and in alignment with the form 12, by indexing of the turret. The position of each pair of brackets 19 on its support is such that the plates 20 are disposed in a plane substantially tangent to the periphery of the form 12 when in alignment therewith, so that strips of tire building fabric 23, 23, mounted upon the fabric-supporting structure may be withdrawn therefrom with no more tension than is caused by their weight and sliding friction on the plates 20, 21.

The plates 21 extend obliquely downward from the rollers 22, and the lower marginal portion of each plate is curved rearwardly as at 24, 24 to provide support for the trailing end portions of the fabric strips 23.

The plates 20, 21 are provided with respective pairs of adjustable side guides 25, 25, 26, 26, which guides serve to center the fabric strips 23 with relation to the building form 12, so that the latter may draw the strips onto itself in accurate alignment in the building of a tire.

The stock rack herein illustrated has four fabric supporting structures, one for each ply of fabric to be incorporated into a four-ply tire, but my invention is not limited to that number. Rising from the turret 14 and extending in the direction of the support which carries the fourth or outer fabric ply of the tire is an angular bracket 27, and journaled in suitable supports on the latter is a roll of breaker strip fabric 28, two rolls of bead-covering material 29, 29, and respective liner-rewinding rolls 30, 31, 31. Extending forwardly from the bracket 27, toward the form 12, is a pair of spaced-apart arms 32, 32, the free ends of which are provided with journals for a shaft 33, and mounted upon the latter, between the arms 32, is a guide structure 34 for the breaker strip fabric 28 and bead covering strips 29, 29. A counterweight 35 weighing slightly less than the guide structure 34 is mounted upon an arm 36 which projects radially from one end of the shaft 33 on the side opposite the guide structure.

The guide structure 34 is adapted to be positioned substantially tangential with relation to the tire building form 12, as indicated by broken lines in Fig. 1, whereby the strips 28, 29 are accurately positioned as they are drawn onto the form by the rotation thereof. A stop 37 on one of the arms 32 is engaged by the arm 36 to define the operative position of the guide structure 34. In its inoperative position shown in full lines in Fig. 1 the guide structure 36 rests in an elevated over-center position against a cross-rod 38 where it does not impede the tire builder. A pair of frusto-conical pressers rollers 39, 39 mounted upon the free ends of respective arms 40, 40 which are pivotally mounted at the free end of the structure 34 are adapted to be positioned upon the bead covering strips 29, 29 as the latter are drawn onto the form 12 to press said strips into conformity with the bead portions of a tire.

In the operation of the device, an operator is provided for cutting to length the various strips of tire building fabric 23 from supply-rolls of the same and mounting the strips on the proper fabric-supporting structures as the latter are successively emptied by the tire builder. Preferably the stock racks of a series of tire machines are so positioned that one operator can supply fabric to at least two of the racks. For placing the fabric on the form the tire builder is required only to attach the leading end of a fabric strip 23 to the form 12 and then rotate the latter, the fabric strip being thereby withdrawn from its support without material tension, and accurately in alignment with the form onto which it is wrapped. The tire builder actuates the turret 14 to bring successive pieces of tire building material into alignment with the form 12 by depressing the foot treadle 16.

The tire building strips 23 remain on the rack for a sufficient interval to recover from any distortion or stretching incidental to their removal from rolls and cutting to length, whereby tires of uniform and superior quality are produced. The saving of the tire builder's time as the result of relieving him from measuring and severing the strips 23 enables the tire builder to increase the output of his machine with resulting saving in the cost of tires, which saving may be further increased by the use of unskilled labor for the simple operations of cutting the strips 23 to length and mounting them on the rack.

The invention may be modified within the scope of the appended claims, as I do not limit my claims wholly to the specific construction shown and described.

I claim:

1. A stock rack comprising a plurality of supports constructed and arranged for individual lengths of tire building material to lie thereupon in fully spread condition and means for presenting said supports with their individual lengths of material successively in alignment with a tire building form.

2. A stock rack comprising a turret, a plurality of supports thereon constructed and arranged for individual, uncoiled lengths of tire building material to lie thereon in fully spread condition, and means for indexing said turret to present the supports with their individual lengths of material in succession in alignment with a tire building form.

3. A stock rack as defined in claim 2 in which the supports for tire building material are provided with side guides for said material.

4. A stock rack comprising a plurality of supports constructed and arranged for individual lengths of tire building material to lie thereupon in fully spread condition, and means for presenting said supports with their individual lengths of material successively in alignment with a tire building form, each of said supports including a portion disposed tangentially with relation to the form when aligned therewith.

5. A stock rack comprising a plurality of supports constructed and arranged for individual lengths of tire building material to lie thereupon in fully spread condition, means for presenting said supports with their individual lengths of material successively in alignment with a tire building form, and means associated therewith for presenting in such alignment the leading end of a roll of tire building material.

6. A stock rack comprising a turret, a plurality of supports thereon constructed and arranged for individual lengths of tire building material to lie thereupon in fully spread condition, means for indexing said turret to present said supports with their individual lengths of material in succession in alignment with a tire building form, and means for presenting the leading end of a roll of tire building material concurrently with the presenting of one of said supports.

In witness whereof I have hereunto set my hand this 5th day of November, 1929.

CHARLES W. LEGUILLON.